B. F. EARLY.

Broom Head.

No. 59,372.

Patented Nov. 6, 1866.

Witnesses.
F. A. Jackson
Wm Irwin

Inventor
B. Frank Early
Per Munry & Stays

UNITED STATES PATENT OFFICE.

B. FRANK EARLY, OF PALMYRA, PENNSYLVANIA.

IMPROVED BROOM-HEAD.

Specification forming part of Letters Patent No. 59,372, dated November 6, 1866.

*To all whom it may concern:*

Be it known that I, B. FRANK EARLY, of Palmyra, in the county of Lebanon and State of Pennsylvania, have invented a new and Improved Broom-Head; and I do hereby declare that the following is a full, clear, and exact description thereof, which will enable others skilled in the art to make and use the same, reference being had to the accompanying drawings, forming part of this specification, in which—

Figure 1:
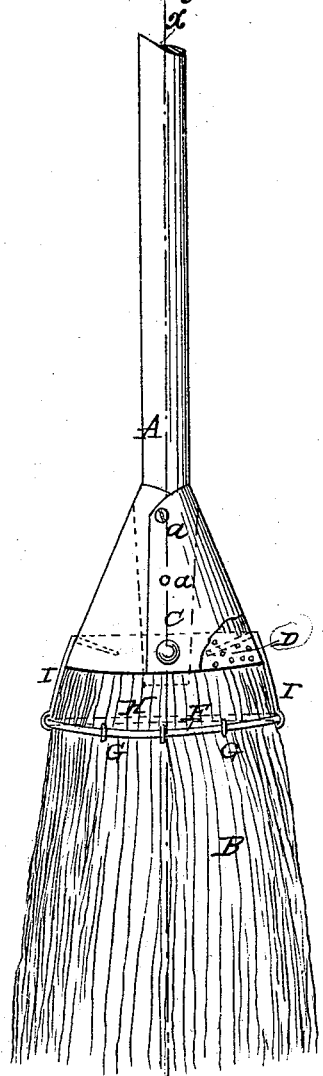
Figure 2:
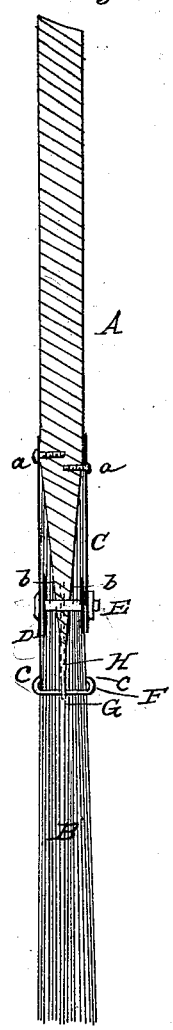

Figure 1 is a side view of my invention, partly in section; Fig. 2, a vertical section of the same, taken in the line $x\,x$, Fig. 1.

Similar letters of reference indicate like parts.

This invention relates to a new and improved means for securing the broom-corn to the handle of a broom, as hereinafter fully shown and described, whereby the tedious and laborious process of binding by cord, twine, or wire is avoided, and a firm, durable, and cheap connection of the broom-corn and handle obtained.

A represents the handle of a broom, constructed of wood, in the usual manner, and B represents the broom-corn, which is secured to the handle as follows:

C is a socket constructed of sheet metal, (tinned plate will answer the purpose,) cut of such a form that it may be bent into the shape of a flattened cone. This socket is lapped at its edges, and is secured at its upper part to the handle by screws or nails passing through the lapped edges of the socket in order to secure the same together.

The lower part of the handle A is inserted into the broom-corn, and the socket encompasses the upper part of the latter, the lower part of the socket encompassing a band, D, which is provided with spurs or projections $b$ at its inner surface to penetrate the broom-corn, and through the lower part of the lapped edges of the socket, the band D, and broom-corn B a bolt, E, passes.

Besides this connection or mode of fastening, the broom-corn is held or retained, in proper position by a wire, F, which encompasses the corn a short distance below the socket, and has the ends of wires G attached to it, said wires G passing transversely through the corn, and secured to the wire F by having their ends bent around it, as shown at $c$ in Fig. 2. The wire F also has the ends of a wire, H, attached to it in a similar manner, which wire passes through the corn in the direction of its broadest part. These wires F G H hold the corn in proper position, and they are prevented from slipping down by means of wires I I, which are attached at their lower ends to the wire F at each side of the corn, and, extending upward, pass into the sides of the socket C and through the band D into the corn.

By this arrangement the handle is firmly secured in the broom-corn and the broom-corn retained in proper shape.

What I claim as new, and desire to secure by Letters Patent, is—

The combination of the socket C, toothed band D, wires F G H, and wire I, substantially as described, for the purpose specified.

The above specification of my invention signed by me this 23d day of June, 1866.

B. FRANK EARLY.

Witnesses:
JOHN KRATZER,
JOHN H. GASS.